United States Patent
Bulatow et al.

(10) Patent No.: US 11,489,420 B2
(45) Date of Patent: Nov. 1, 2022

(54) METHOD FOR MANUFACTURING A ROTOR FOR AN ELECTRICAL MACHINE WITH A CONTACTLESS POWER TRANSMISSION SYSTEM, AND ROTOR, ELECTRICAL MACHINE AND MOTOR VEHICLE

(71) Applicant: Vitesco Technologies GMBH, Hannover (DE)

(72) Inventors: Michael Bulatow, Berlin (DE); Wilhelm Hackmann, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 154 days.

(21) Appl. No.: 16/797,821

(22) Filed: Feb. 21, 2020

(65) Prior Publication Data
US 2020/0195104 A1 Jun. 18, 2020

Related U.S. Application Data

(63) Continuation of application No. PCT/EP2018/071527, filed on Aug. 8, 2018.

(30) Foreign Application Priority Data

Aug. 23, 2017 (DE) ...................... 10 2017 214 776.8

(51) Int. Cl.
*H02K 15/12* (2006.01)
*H02K 15/02* (2006.01)
(Continued)

(52) U.S. Cl.
CPC .......... *H02K 15/026* (2013.01); *H01F 38/18* (2013.01); *H02J 50/10* (2016.02); *H02K 1/30* (2013.01);
(Continued)

(58) Field of Classification Search
CPC .......... H02K 5/08; H02K 15/12; H02K 5/225; H02K 1/187; H02K 3/522; H02K 3/51;
(Continued)

(56) References Cited

U.S. PATENT DOCUMENTS

| 4,612,486 A * | 9/1986 | Ban ........................ H02K 29/12 310/113 |
| 2013/0241367 A1* | 9/2013 | Taniguchi .............. H02K 7/003 310/68 D |

(Continued)

FOREIGN PATENT DOCUMENTS

| CN | 104200967 A | 12/2014 |
| CN | 105529168 A | 4/2016 |

(Continued)

OTHER PUBLICATIONS

DE-102014202719-A1 machine translation Jan. 15, 2021.*
(Continued)

*Primary Examiner* — Leda T Pham (57) ABSTRACT

A method for manufacturing a rotor for an electric machine with a contactless power transmission system, wherein an end winding cover is arranged on one end face of a laminated core of the rotor. The invention provides that a secondary unit (SEC) of the power transmission system is integrated in the end winding cover and, as a result, after the end winding cover has been arranged, the secondary unit (SEC) is held on the rotor indirectly via the end winding cover.

11 Claims, 11 Drawing Sheets

(51) Int. Cl.
| | |
|---|---|
| *H02J 50/10* | (2016.01) |
| *H01F 38/18* | (2006.01) |
| *H02K 1/30* | (2006.01) |
| *H02K 3/51* | (2006.01) |
| *H02K 3/52* | (2006.01) |
| *H02K 11/00* | (2016.01) |
| *H02K 11/042* | (2016.01) |
| *H02K 15/06* | (2006.01) |
| *H02K 15/16* | (2006.01) |
| *H02K 19/12* | (2006.01) |

(52) U.S. Cl.
CPC ............... *H02K 3/51* (2013.01); *H02K 3/527* (2013.01); *H02K 11/0094* (2013.01); *H02K 11/042* (2013.01); *H02K 15/061* (2013.01); *H02K 15/12* (2013.01); *H02K 15/165* (2013.01); *H02K 19/12* (2013.01)

(58) Field of Classification Search
CPC .......... H02K 3/24; H02K 3/505; H02K 3/527; H02K 55/04; H02K 11/21; H02K 15/165; H02K 1/30; H02K 11/042; H02K 15/061; H02K 11/0094; H01F 38/18
See application file for complete search history.

(56) References Cited

U.S. PATENT DOCUMENTS

2015/0035394 A1\* 2/2015 Bulatow ................. C22C 38/40
310/66

2015/0097461 A1\* 4/2015 Bulatow .................. H02K 1/22
310/216.004

FOREIGN PATENT DOCUMENTS

| CN | 105811625 A | 7/2016 | |
|---|---|---|---|
| CN | 206149118 U | 5/2017 | |
| CN | 107979201 A | 5/2018 | |
| DE | 102009014960 | 12/1899 | |
| DE | 202012002027 U1 | 3/2012 | |
| DE | 2020120022024 | 3/2012 | |
| DE | 102012205760 A1 | 10/2013 | |
| DE | 102012021600 A1 | 5/2014 | |
| DE | 10201402719 | 10/2014 | |
| DE | 102013021746 B3 | 10/2014 | |
| DE | 102014202719 A1 \* | 8/2015 | ............. H01F 38/18 |
| DE | 102015116141 A1 | 3/2016 | |
| EP | 0511082 A1 | 10/1992 | |
| WO | 2008034773 A1 | 3/2008 | |

OTHER PUBLICATIONS

Chinese Office Action dated Mar. 29, 2021 for corresponding Patent Application No. 201880053494.6.
International Search Report and Written Opinion dated Aug. 23, 2017 from corresponding International Patent Application No. PCT/EP2018/071527.
German Office Action dated Aug. 17, 2018 for corresponding German Patent Application No. 10 2017 214 776.8.

\* cited by examiner

METHOD FOR MANUFACTURING A ROTOR FOR AN ELECTRICAL MACHINE WITH A CONTACTLESS POWER TRANSMISSION SYSTEM, AND ROTOR, ELECTRICAL MACHINE AND MOTOR VEHICLE

CROSS-REFERENCE TO RELATED APPLICATIONS

This application claims priority to PCT Application PCT/EP2018/071527, filed Aug. 8, 2018, which claims priority to German Patent Application No. DE 10 2017 214 776.8 filed Aug. 23, 2017. The disclosures of the above applications are incorporated herein by reference.

FIELD OF THE INVENTION

The invention relates to a method for manufacturing a rotor for an electric machine. By way of the method, a secondary unit of an electrical, contactless power transmission system with a rotary transformer is arranged on the rotor. The invention also includes the finished rotor, an electric machine with a contactless power transmission system based on the rotor, and a motor vehicle with the electric machine.

BACKGROUND OF THE INVENTION

A rotary transformer of the type mentioned is known for example from DE 10 2014 202 719 A1. Accordingly, a power transmission system for an electric machine has a primary-side winding of a rotary transformer for a fixed arrangement in the electric machine and for generating an alternating magnetic field. Furthermore, the power transmission system has a secondary-side winding of the rotary transformer for arrangement on one end face of the rotor of the electric machine and for converting the magnetic flux that changes over time into an AC voltage, and a rectifier board with a rectifier circuit for rectifying the AC voltage. The rotary transformer is a rotationally symmetrical transformer with an air gap, wherein the secondary-side winding is rotatably mounted with respect to the primary-side winding. The rotor of the electric machine may therefore rotate with the winding on the secondary side in the alternating magnetic field of the winding on the primary side. A rectifier board of the rectifier connected to the secondary-side winding is set up to generate a DC voltage from the AC voltage generated by the secondary-side winding and to make it available at connection contacts for the excitation winding. The current in the excitation winding therefore always flows when a DC voltage is generated at the two connection contacts. It is known from the prior art that the secondary-side winding may be formed on the basis of conductor tracks of a circuit board. Such a circuit board with conductor tracks for a winding is referred to below as a winding board. "Winding" is therefore not meant here to refer to a wound wire, but rather the function of an electrical winding, i.e. an arrangement with an electrical coil.

The advantages of non-contact or contactless electrical power transmission by inductive coupling to supply the excitation winding of a rotor of an externally excited synchronous machine ("ESM" or "FSM") with a DC voltage are that electrical power may be transmitted into the rotating rotor without using slip-ring carbon-brush systems, and thus no abrasion of carbon brushes with the associated dust may occur. The weak points of contactless power transmission systems are the not always guaranteed speed stability, which in the area of traction drives for motor vehicles may be greater than 15,000 revolutions per minute, the insulation of the turns of the windings of the rotary transformer of the power transmission system and the matter of ensuring that the required air gap between rotating and stationary parts of the non-contact power transmission system is maintained.

Compliance with these boundary conditions becomes even more difficult with the industrialization of the manufacture of such a power transmission system for non-contact excitation winding current transmission. Manufacturing tolerances must be observed here in order to guarantee in any case the temperature resistance and speed stability of the rotors produced or manufactured.

A rotor for an electric machine in which an end winding cover for covering the end windings of the rotor is arranged on one end face is known from DE 20 2012 002 027 U1. A sensor track for a rotor position encoder is arranged on the end winding cover.

A rotor with an end winding cover in which a balancing ring is arranged to compensate for an imbalance of the rotor is known from DE 20 2012 002 024 U1.

SUMMARY OF THE INVENTION

The invention is based on the object of providing a rotor for an externally excited synchronous machine which may be supplied with electrical power by a contactless power transmission system, and which in this case has sufficient temperature resistance and high speed stability (over 15 000 revolutions per minute).

The object is achieved by the subjects described. Advantageous developments of the invention are described by the following description and the figures.

The invention provides a method for manufacturing a rotor for an electric machine with a contactless power transmission system. Another term for a contactless power transmission system is also a contactless current transmission system. The method assumes that an end winding cover is arranged on one end face of a laminated core of the rotor. An end winding cover is already described in DE 20 2012 002 027 U1 and DE 20 2012 002 024 U1. The method according to the invention thus provides that the secondary unit of the power transmission system is integrated in the end winding cover. The secondary unit is the secondary side of the power transmission system. It has the secondary-side winding of a rotary transformer and a rectifier board and contact elements for the excitation winding of the rotor. Because the secondary unit is fastened in the end winding cover, when the end winding cover has been arranged on the laminated core of the rotor it is held on the laminated core, and ultimately on the rotor, indirectly via the end winding cover. In other words, the end winding cover is a carrier part for the secondary unit of the power transmission system.

The invention provides the advantage that the secondary unit may be fastened together with the end winding cover on the laminated core in one working step and the centering of the end winding cover at the same time brings about a centering of the secondary unit.

The invention also includes developments that provide additional advantages.

One development provides that the end winding cover has a through-opening, through which the shaft of the rotor may be inserted. The secondary unit of the rotary transformer is provided as an annular disk or as a ring, which is inserted into the through-opening. The insertion into the through-opening ensures a concentric arrangement of the secondary unit with respect to the rotary shaft.

In order to fasten the end winding cover and the secondary unit on the rotor, cavities in the wound laminated rotor core and a cavity in the end winding cover may be filled with a filling compound. The end winding cover is held on the rotor by curing the filling compound. In the end winding cover there may be for example an undercut, in order to produce a positive connection between the cured filling compound and the end winding cover. Filling with filling compound has the advantage that a fixing and centering of the end winding cover on the rotor is guaranteed. In addition, by selecting a suitable material for the filling compound, a thermal conductivity that is greater than the thermal conductivity of air may be guaranteed.

While the end winding cover and the entire rotor are filled with the filling compound, the end winding cover is preferably held on the laminated core by a sleeve. The sleeve may for example be stretched around the end winding cover and the laminated core as an elastic ring. By way of such a sleeve, the end winding cover may be centered with respect to the laminated core. At the same time, the sleeve seals off the region between the end winding cover and the laminated core so that no filling compound escapes. The sleeve may for example be made of silicone.

One development provides that, for filling the rotor, an intermediate space or annular gap between the secondary unit and the shaft of the rotor is closed with an annular plug. This allows the secondary unit to be centered in addition or as an alternative to the sleeve. Because of the plug, a region which later forms a radial air gap of the rotary transformer of the power transmission system may also be kept free of the filling compound. It may also be achieved that the filling compound may be drawn into predetermined regions of the secondary unit, for example between components of the rectifier board of the rectifier of the secondary unit, by negative pressure. The filling compound cannot escape through the annular gap. The plug closes the annular gap in an airtight manner. This allows a negative pressure or vacuum to be generated in the cavity of the end winding cover in order to suck the filling compound into the cavity. In addition, a positive pressure may also be used for feeding in the filling compound.

In connection with the plug, the invention also includes a mounting arrangement in which the end winding cover with the integrated secondary unit of the power transmission system is arranged on a shaft of the rotor in such a way that the annular gap is formed between the secondary unit and the shaft. A plug is arranged in the annular gap, wherein the annular gap is closed by the plug in an airtight manner. As a result, a filling compound may be drawn into the cavity by negative pressure in the cavity of the end winding cover. The plug may for example be made of silicone. Then the filling compound does not stick to the plug and it may be reused.

According to one development, it is provided that the filling with the filling compound is performed by filling up the rotor using a potting compound. Therefore, the filling compound is then the potting compound. As an alternative to this, it may be provided that an injection-molding compound (plastic overmolding) is injected using an injection-molding process. Therefore, the filling compound is then the injection-molding compound. Both methods have the advantage that the filling compound may be pressed into the laminated core and the cavity of the end winding cover at a pressure greater than atmospheric pressure. The air is preferably additionally evacuated from the cavity.

One development provides that, when the end winding cover is arranged with the secondary unit arranged therein, the end winding cover is first held at a predetermined distance greater than 0 from the end face of the rotor, and a first fastening tool (for example a welding electrode) is moved or inserted along a radial direction between the end face and the end winding cover. A second fastening tool (for example a tubular electrode) is moved or inserted along an axial direction between two winding hooks of the secondary unit (which may be fastened on a rectifier board) and the shaft surface of the shaft of the rotor. The second fastening tool is therefore moved through the annular gap toward the end face of the laminated rotor core. Using the two fastening tools, at least one electrical connection contact of an electrical excitation winding of the rotor is connected to a respective contact element of the rectifier of the secondary unit. Due to the described insertion of the fastening tools, they meet in a region where the two directions of insertion intersect. There, the contact element of the rectifier may then be worked on using the two fastening tools.

According to one development, it is provided here that, using the fastening tools, the connection contact is fastened to the respective contact element by soldering or welding or crimping or clamping. The fastening tools are then designed accordingly. Using these fastening methods, the excitation winding of the rotor and the rectifier board may be contacted.

According to one development, the second fastening tool is a tube which is slipped over a shaft end of the rotor. A tubular electrode is therefore used for the welding or soldering. The tube is more rigid than a rod, so that the contact element (for example a winding hook) may be additionally bent on the tube, for example by it being pressed onto it using the first fastening tool.

One development provides that the winding hook, which is inserted with the rear end into the rectifier board of the rectifier, is provided as the respective contact element. The rear end is therefore in the rectifier board, so that the winding hook protrudes from the rectifier board. A piece of the connection contact of the excitation winding of the rotor may be placed around the winding hook, and thereafter the winding hook may be pressed together or bent. An electrical connection of the winding hook to the rectifier board may be produced on the front, the back or on both sides of the rectifier board, for example by soldering, caulking, welding and/or riveting.

A metal core, which may be formed from aluminum or copper or an alloy with aluminum and/or copper, is preferably provided in the rectifier board. Using the metal core, a cooling of components of the rectifier board may be achieved. In addition, the metal core mechanically stabilizes the rectifier board, which promotes speed stability and stability when bending a winding hook.

The invention also includes the secondary unit for a rotary transformer of an electrical power transmission system, wherein the prefabricated secondary unit is designed for integration into an end winding cover of a rotor of an electric machine and wherein the secondary unit is a separately supplied part for insertion into the end winding cover and is potted or overmolded with a plastic independently of the rotor.

The rotor manufactured using the method according to the invention is likewise part of the invention. The invention thus also includes the rotor for an electric machine, wherein the rotor has a laminated core, on which an end winding cover is arranged on one end face. According to the invention, a secondary unit of a power transmission system is integrated or accommodated in the end winding cover. As already stated, the filling compound which fills up the cavity between the end winding cover and the laminated core provides a fastening.

In addition to the secondary unit, a power transmission system as a whole also has the primary unit, which may have the winding for generating the alternating magnetic field described. Overall, the invention in this context also includes the electric machine described, with the contactless or non-contact electrical power transmission system, the primary unit of which is arranged on a housing or end shield of the electric machine. The electric machine has furthermore an embodiment of the rotor according to the invention, by which the secondary unit of the power transmission system is provided.

Finally, the invention also includes a motor vehicle with the electric machine according to the invention. The motor vehicle may be for example a motor car.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

An exemplary embodiment of the invention is described below, the figures showing.

DETAILED DESCRIPTION OF THE PREFERRED EMBODIMENTS

The following description of the preferred embodiment(s) is merely exemplary in nature and is in no way intended to limit the invention, its application, or uses.

The exemplary embodiment is a preferred embodiment of the invention. In the exemplary embodiment, the described components of the embodiment each represent individual features of the invention which are to be considered independently of one another and which each also develop the invention independently of one another and may therefore also be considered to be a constituent part of the invention, either individually or in a combination other than that shown. Furthermore, the embodiment described may also be supplemented by further features of the invention from among those which have already been described.

In the figures, functionally identical elements are respectively provided with the same reference signs.

Figure 11:
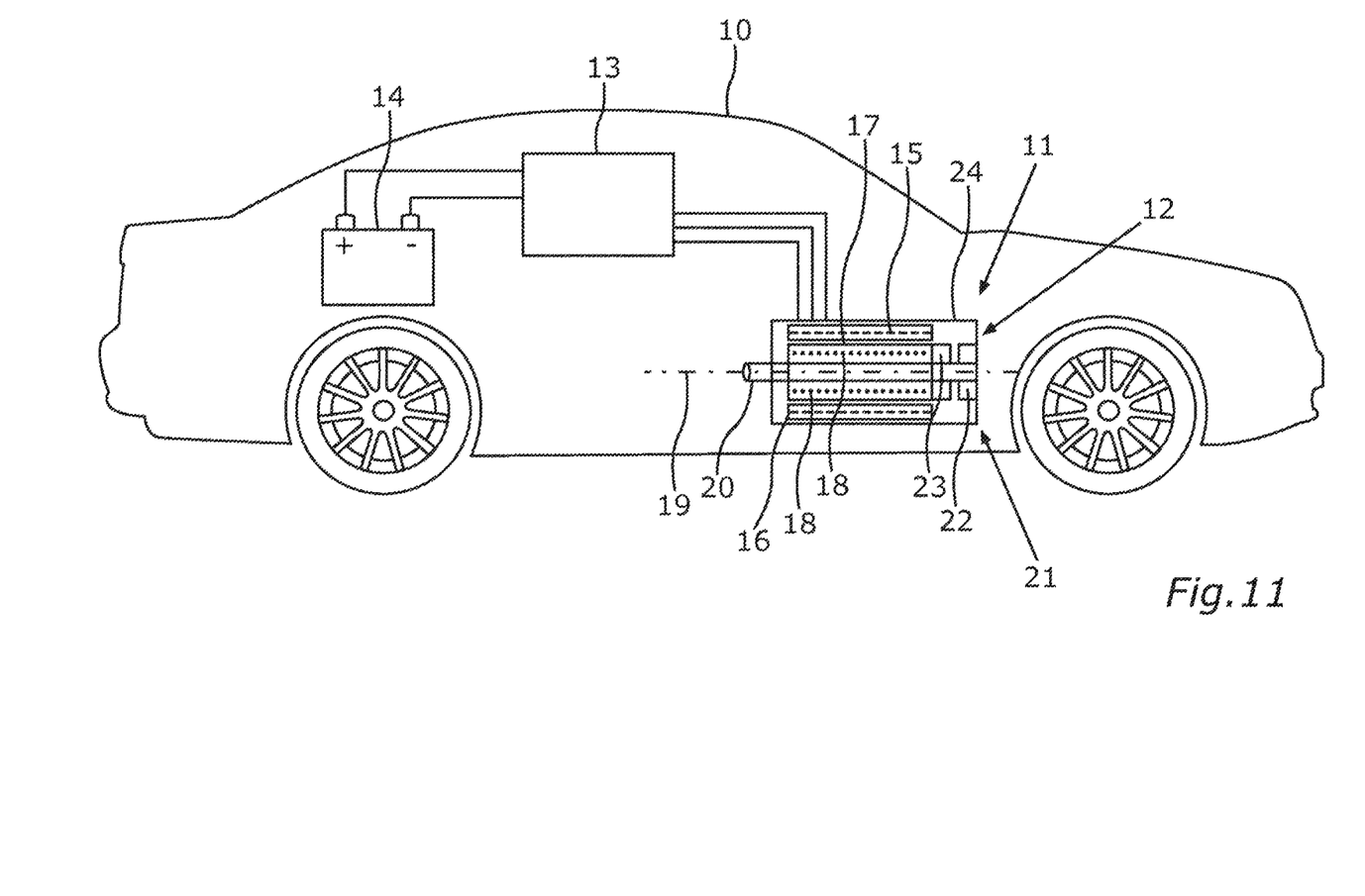
FIG. 11 a schematic representation of an embodiment of the motor vehicle according to the invention.

As an overview, reference is first made to FIG. 11. FIG. 11 shows a motor vehicle 10, which may be a motor car, such as for example a passenger car. The motor vehicle 10 may have an electric traction drive 11, which may be formed on the basis of an electric machine 12. In addition, an inverter 13 and a traction battery 14 are shown. The traction battery 14 may be for example a high-voltage battery, which may provide an electrical voltage greater than 60 V, such as greater than 100 V. The inverter 13 may generate phase currents for a stator winding 15 of a stator 16 of the electric machine 12 from the DC voltage of the traction battery 14 in a manner known per se. The phase currents of the inverter 13 are used to generate a rotating magnetic field in an interior of the stator 16 using the stator winding 15.

A rotor 17 may be rotatably mounted in the interior of the stator 16. The electric machine 12 may be an externally excited synchronous machine. For this purpose, an excitation winding 18, through which a DC current may flow, is provided in the rotor 17. The rotor 17 then generates magnetic poles on its outer circumference, interacting with the rotating magnetic field of the stator 16, which results in a rotary movement of the rotor 17. The rotor then rotates about an axis of rotation 19 and thereby turns a shaft 20, via which a drive torque is transmitted to wheels of the motor vehicle 10.

In order to generate the current in the excitation winding 18, the electric machine 12 may have a power transmission system 21. Using the power transmission system 21, electrical energy is transmitted to the rotor 17 contactlessly, on the basis of an inductive transmission. For this purpose, the power transmission system 21 may have a rotary transformer with a primary-side winding 22 on a housing part or end shield 24 and a secondary-side winding 23 on the rotor 17.

Figure 1:
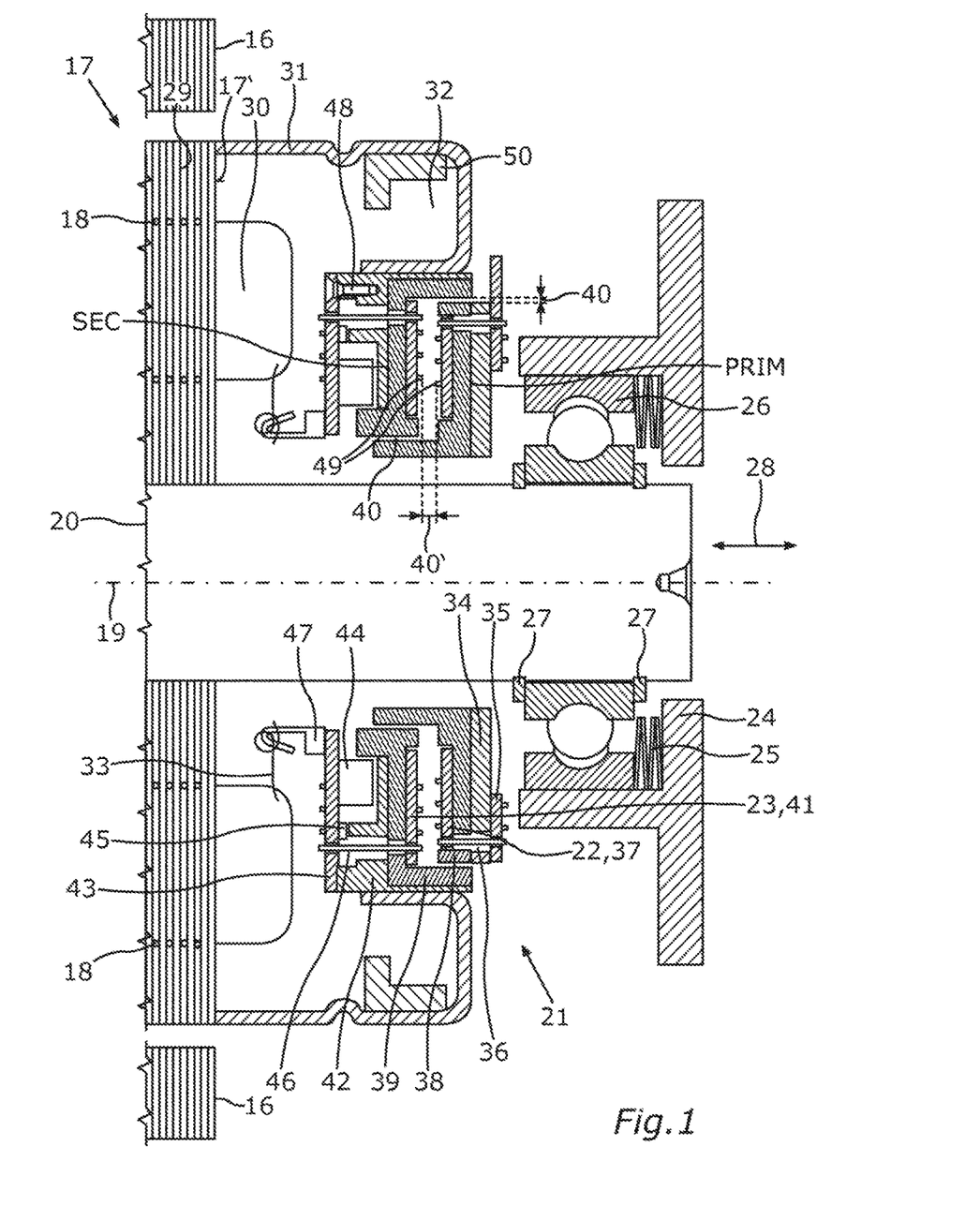
FIG. 1 a schematic representation of a longitudinal section of an externally excited rotor with brushless power transmission.

FIG. 1 illustrates in this respect the power transmission system 21 in a longitudinal section. FIG. 1 is mirror-symmetrical with respect to the axis of rotation 19, so that the reference signs are in each case only indicated on one side of the axis of rotation 19. They also apply mirror-symmetrically to the opposite side.

The power transmission system 21 may have been manufactured by a manufacturing method that may have the following advantageous properties:

It is a manufacturing method for traction drives with externally excited synchronous machines with contactless power transmission with an excitation current transmission system or power transmission system that is provided at low cost and a high temperature resistance and speed stability (over 15 000 rpm).

A special sealing concept is provided, allowing the rotor to be potted with an epoxy resin or filled with a plastic by an injection-molding process.

A special geometry of the rotary transformer of the power transmission system and the special axial sealing of the rotor in the region of the rotary transformer guarantee the reliable potting or injection-molding process as well as the axial and radial air gap of the rotary transformer.

The rotary transformer is centered radially during the potting process with the aid of a cover of the end windings.

A special manufacturing method (for welding the winding wire to the winding hook) for contacting the winding wire of the rotor winding with the secondary side of the power transmission system is provided.

A special concept for accommodating the winding hooks on the rectifier board is provided.

For better heat dissipation from all of the components of the rotary transformer, including the winding and electronic parts of the secondary side of the rotary transformer, a special epoxy resin or special plastic (preferably with a higher thermal conductivity than air) is used in the potting or plastic injection-molding process.

A special geometry of the cover of the end winding is produced at low cost and allows for example the accommodation of a sensor track and a balancing ring (see the publications mentioned at the beginning DE 20 2012 002 024 U1 and DE 20 2012 002 027 U1). However, another type of rotor position encoder may also be provided. In this case, the sensor track is substituted by another position-giving element.

With an axial signal transmission (from the encoder wheel, which is accommodated on the rotor, to a rotor position encoder), the cover of the end winding is designed as one part with the sensor track (optional), a balancing ring and a special seat for the rotary transformer. A suitable material composition of the cover of the end winding may in this case be considered (see documents DE 20 2012 002 024 U1 and DE 20 2012 002 027 U1 for the material composition).

For further explanation of the method, FIG. 1 specifically shows a movable bearing side (non-driving side) of the electric machine 12. The end shield or motor housing 24 and a spring element 25 are shown.

The shaft 20 of the rotor 17 is rotatably mounted on the end plate or motor housing 24 via a bearing 26. Circlips 27 fix the bearing 26 in the axial direction 28 along the axis of rotation 19. Of the rotor 17, also shown are a laminated core 29, end windings 30 of the excitation winding 18, a cover 31 of the end windings 30 with a potting compound 32 arranged therein and wires 33 of the excitation winding 18. The wires 33 may be connected to the power transmission system 21. Each wire 33 thus represents a connection contact.

The power transmission system has a primary unit PRIM fastened on the end plate or motor housing 24 and a secondary unit SEC fastened on the rotor. The primary unit PRIM provides a primary side and the secondary unit a secondary side of a rotary transformer. The primary unit PRIM and the secondary unit SEC are each formed as rings, which are arranged around the shaft 20. The secondary unit SEC may be arranged on one end face 17' of the rotor 17.

Of the power transmission system 21, shown from the primary unit PRIM are the primary-side winding 22, a heat sink 34, a connection board 35 for providing a supply voltage (outgoing electrical lines are not shown), metal pins 36 for through-contacting the connection board 35 to a winding board 37 of the primary-side winding 22 and a primary ferrite core 38.

A radial air gap 40, via which a flux generated by the primary winding 22 may change over into the ferrite core 39 of the secondary unit SEC, is obtained in a magnetic circuit. Since it is a radial air gap 40, its gap dimension does not change when there is an axial movement of the shaft 20 in the axial direction 28. With the axial movement, an axial air gap 40' changes. The ferrite cores 38, 39 each have an L profile. This also allows radial tolerances to be compensated.

Also shown from the secondary unit SEC are: a winding board 41 of the secondary-side winding 23, a heat sink 42, a rectifier board 43 with a rectifier circuit that includes capacitors 44 and diodes 45, metal pins 46, via which the winding board 41 is electrically connected to the rectifier board 43, and hooks 47, at which the wires 33 of the excitation winding 18 are contacted. Each hook 47 thus represents a contact element. The hooks 47 are also referred to as winding hooks. They each represent a connection contact of the rectifier circuit. The rectifier board 43 may be connected directly to the heat sink 42 by metal screws (an associated countersink with a thread 48 is shown). The heat sink 42 bears against the cover 31 with a coupling surface 42'. It may be a press fit. The cover may be made of a non-magnetizable metal or a non-magnetizable metal alloy.

The winding 23 may be realized on the winding board 41 as a flat coil having conductor tracks. For this purpose, the winding board 41 may be of a single-layer or multi-layer design.

Figure 2:
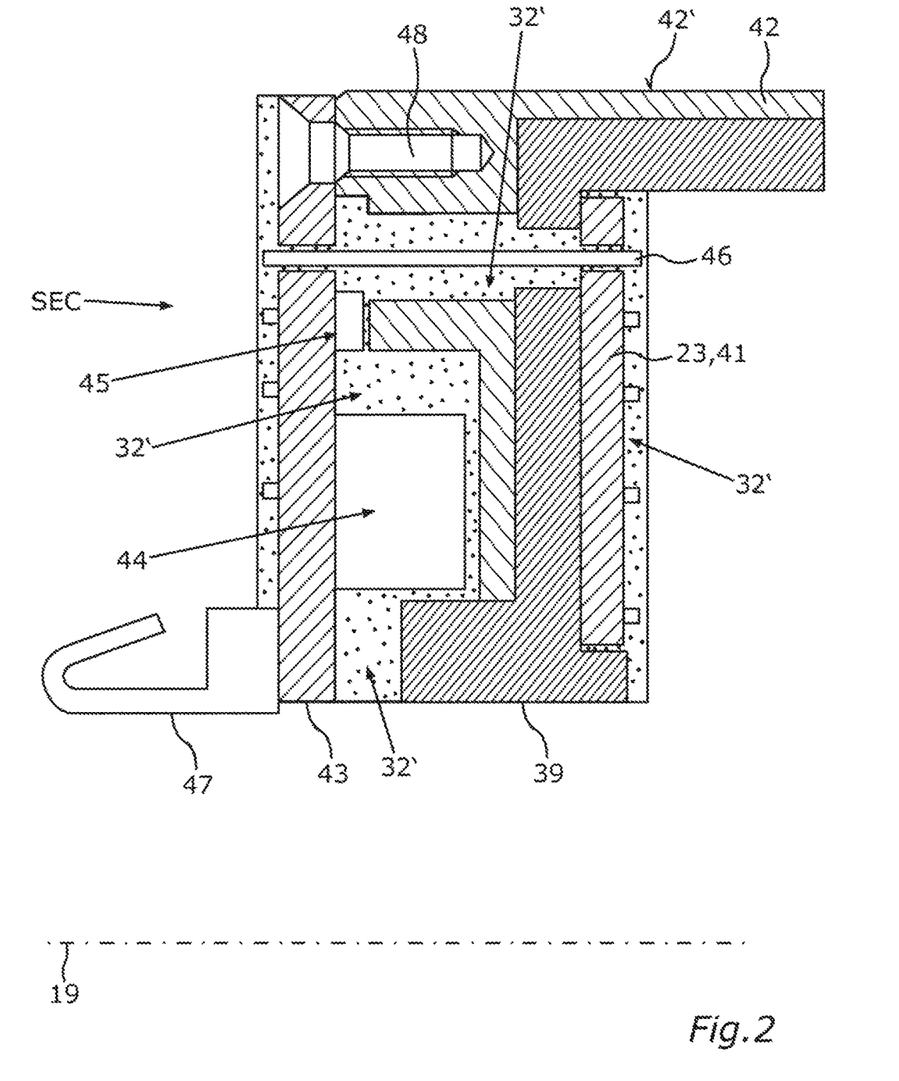
FIG. 2 a schematic representation of a longitudinal section of a secondary unit of a power transmission system of the rotor from FIG. 1.

FIG. 2 shows the upper section of the secondary unit SEC, as shown in FIG. 1, on an enlarged scale. It shows how intermediate spaces are filled or filled up with a potting compound of an epoxy resin or are filled or filled up with plastic using an injection-molded filling. This potting or injection-molded filling 32' on the one hand allows the secondary unit SEC to be stabilized for a high speed. The power transmission system 21 is thereby provided with speed stability for speeds greater than 15,000 revolutions per minute. Furthermore, the potting or the injection-molded filling 32' offers a solid-based heat transfer from the electronic parts and the winding via the heat sink into the end winding cover. A special cooling of the components via the following "heat path" is proposed: from the components via heat sinks of the power transmission system and special highly heat-conducting epoxy resin or special highly heat-conducting plastic, then to the cover of the end winding and thereafter into the engine compartment of the electric machine.

The secondary unit SEC may be held on the rotor 17 indirectly by the end winding cover 31 and the potting compound 32.

A balancing ring 50 may be arranged in the end winding cover 31. The balancing ring 50 may have an L-profile. With respect to the axial direction of the laminated core 29, the balancing ring 50 may have an undercut in which the potting compound 32 may engage. As a result, the end winding cover 31 is held on the laminated core 29.

Figure 3:
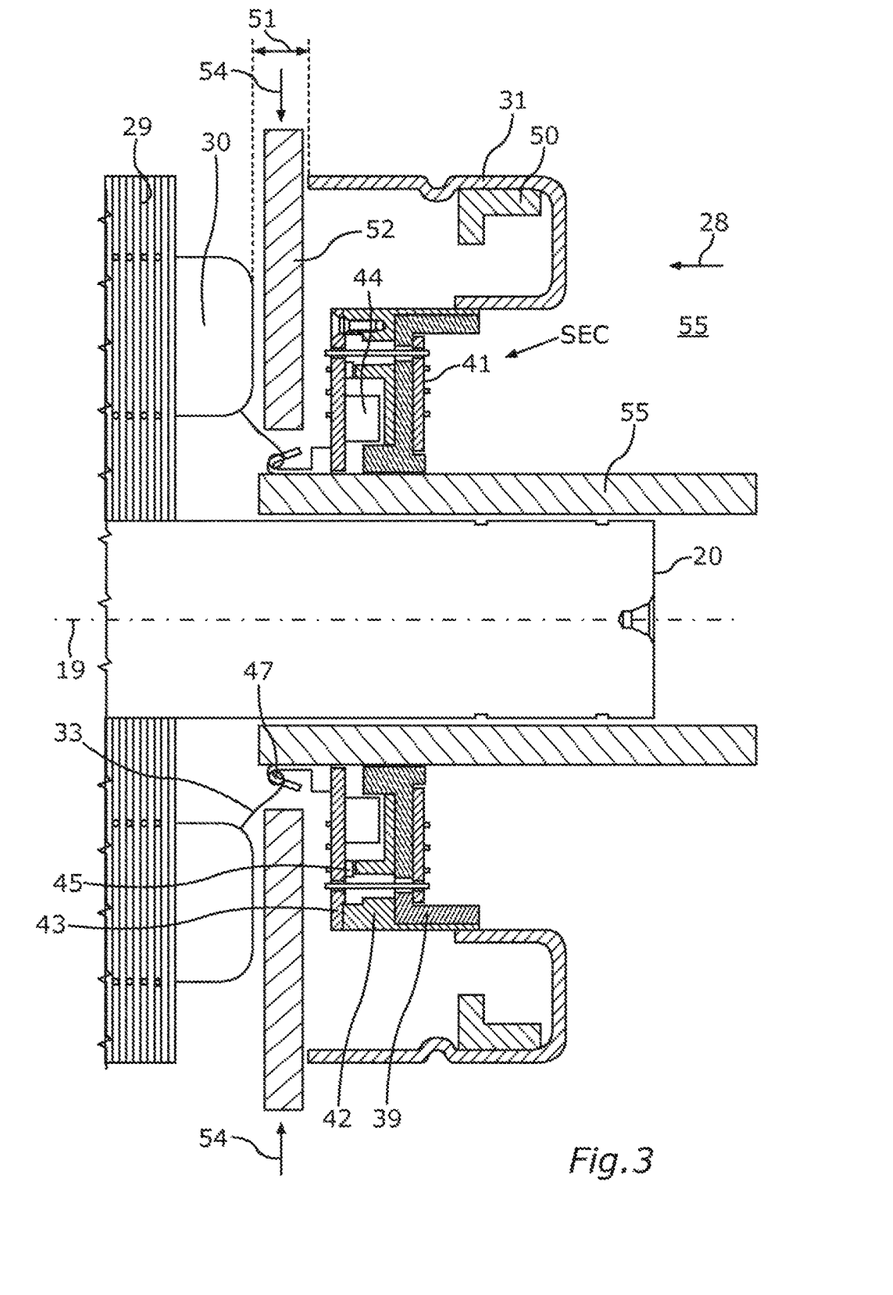
FIG. 3 a schematic representation of the rotor during its completion when the secondary unit is being assembled.
Figure 4:
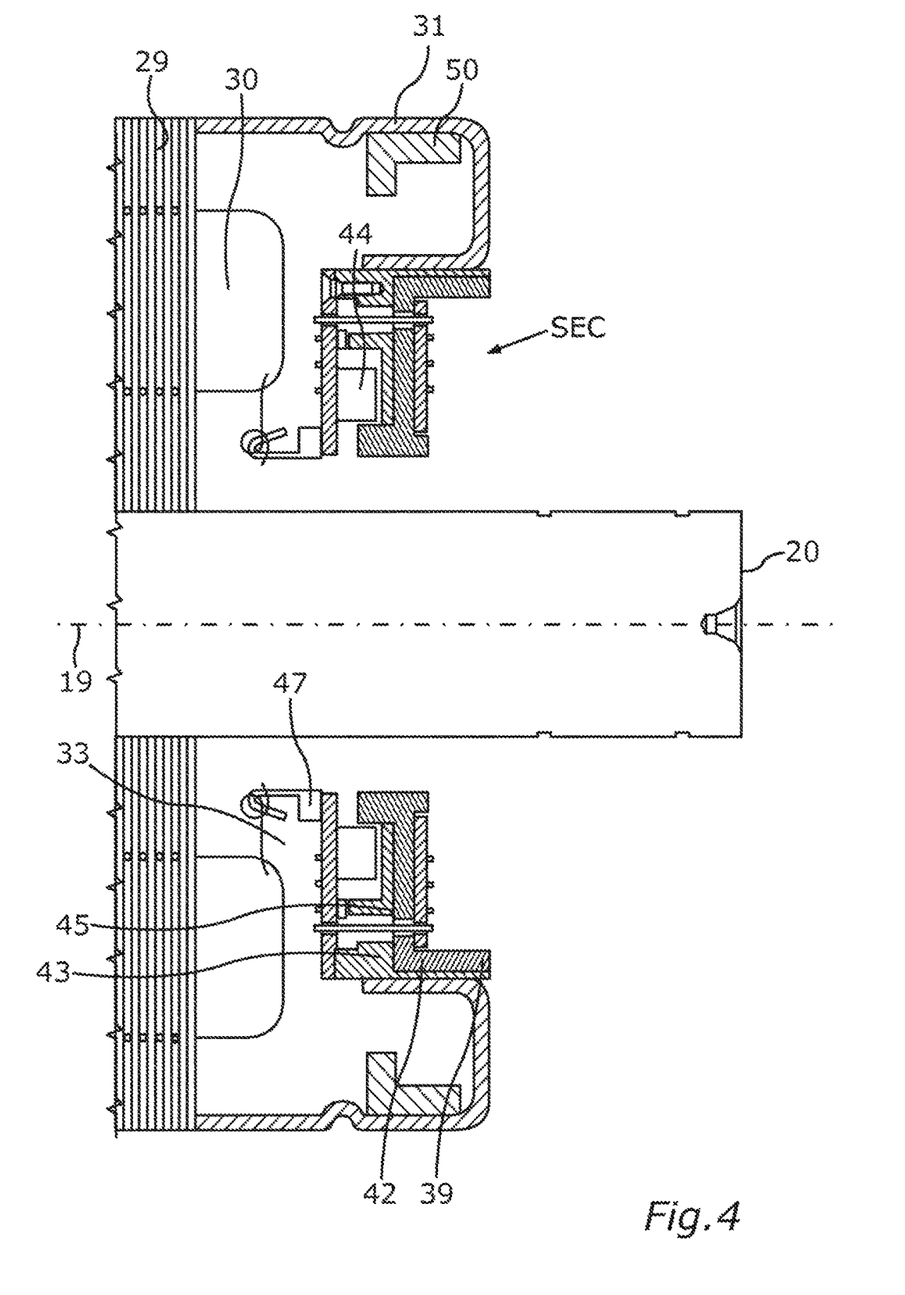
FIG. 4 a schematic representation of the rotor during its completion after the assembly of the secondary unit and before potting.
Figure 5:
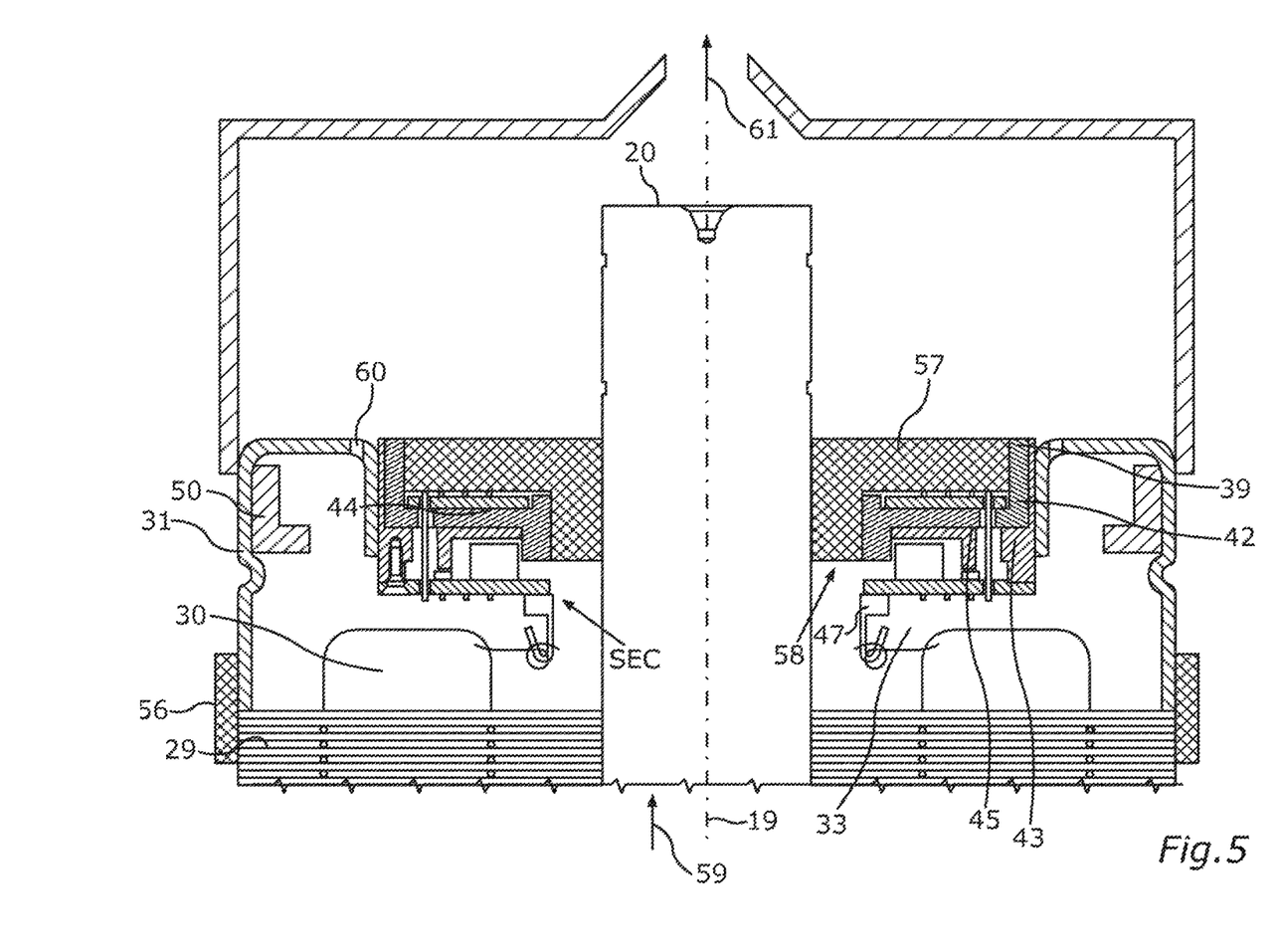
FIG. 5 a schematic representation of the rotor during its completion when potting.
Figure 6:
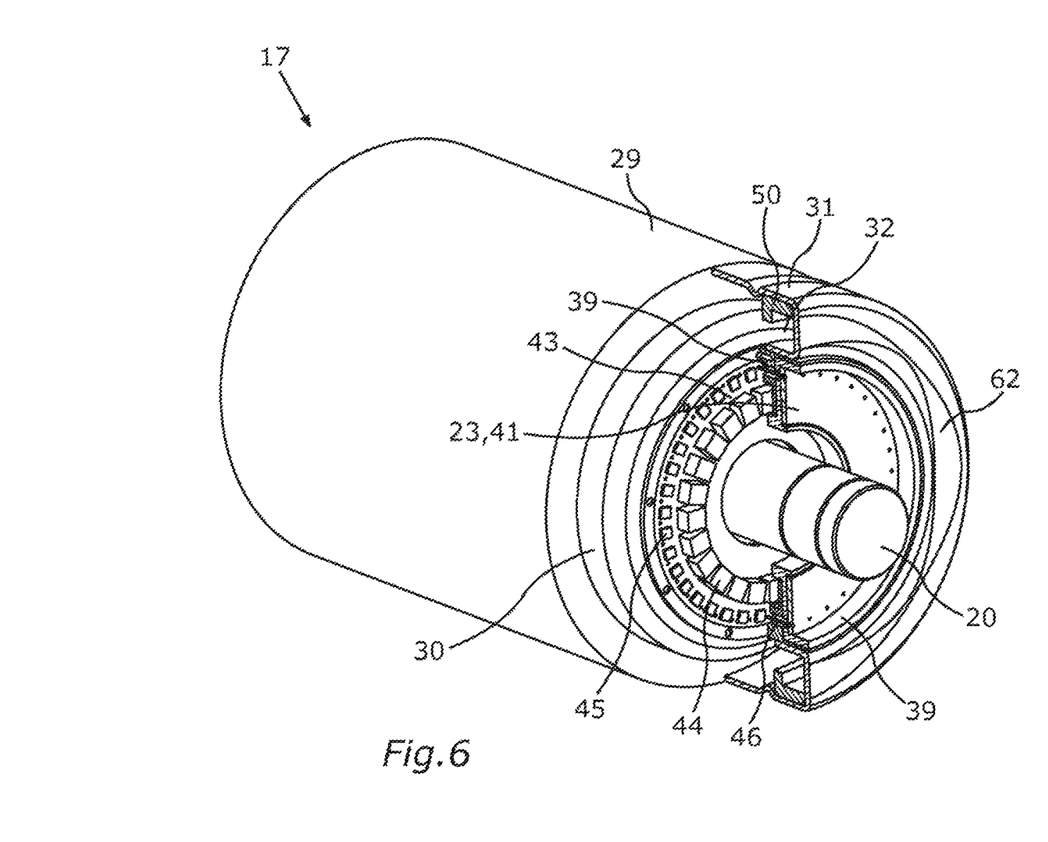
FIG. 6 a schematic representation of a perspective view of the rotor with a partial section.
Figure 7:
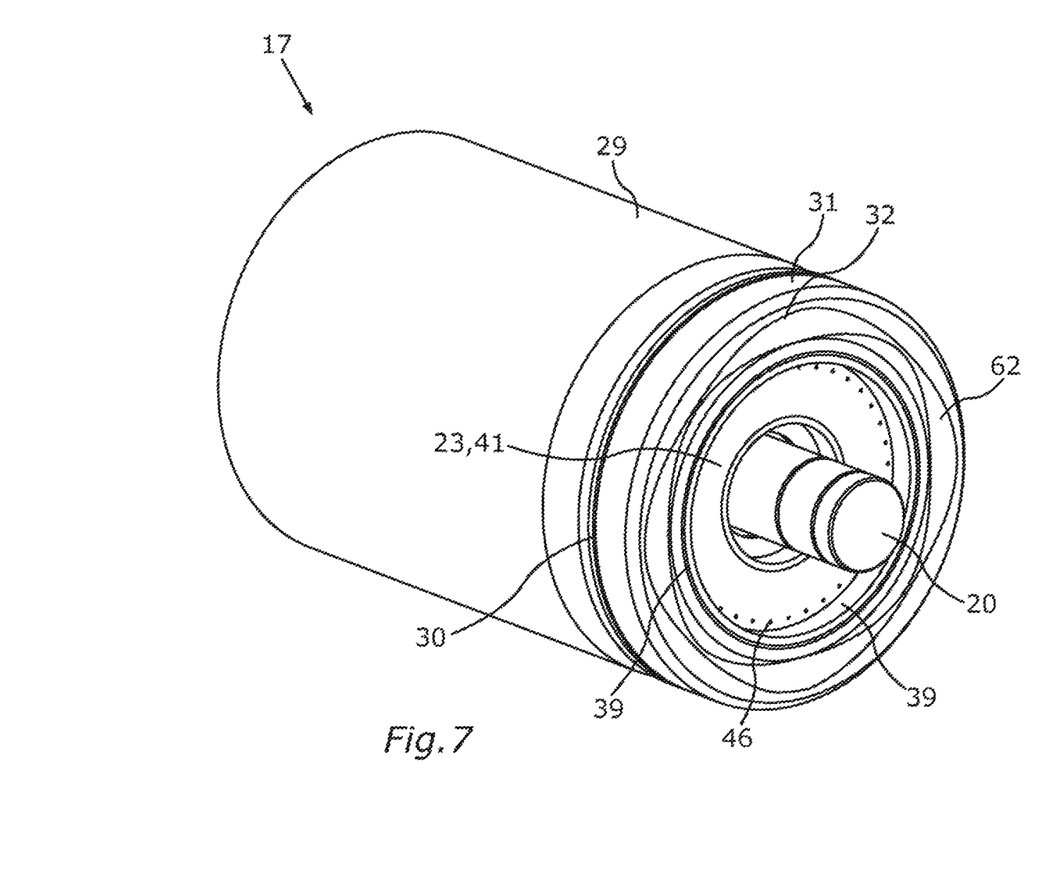
FIG. 7 a schematic representation of a perspective view of the rotor.
Figure 8:
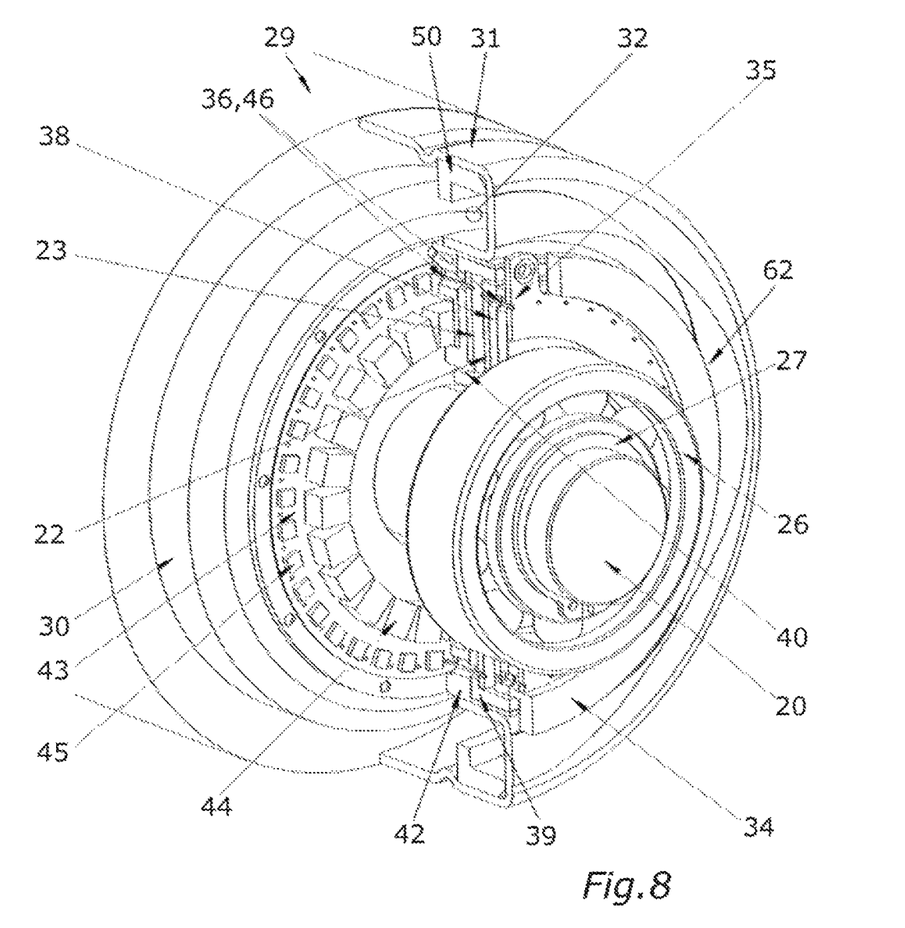
FIG. 8 a schematic representation of a perspective view of the rotor as a partial section.
Figure 9:
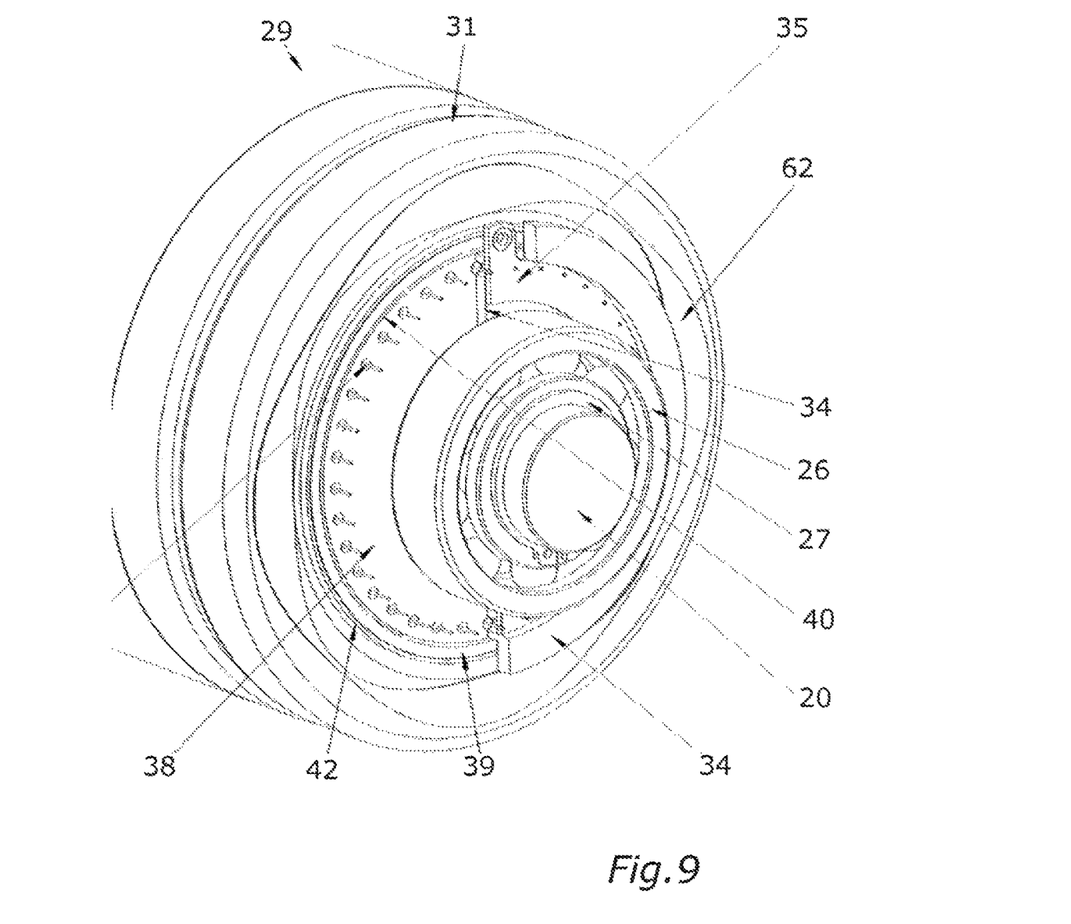
FIG. 9 a schematic representation of a perspective view of the rotor as a partial section.
Figure 10:
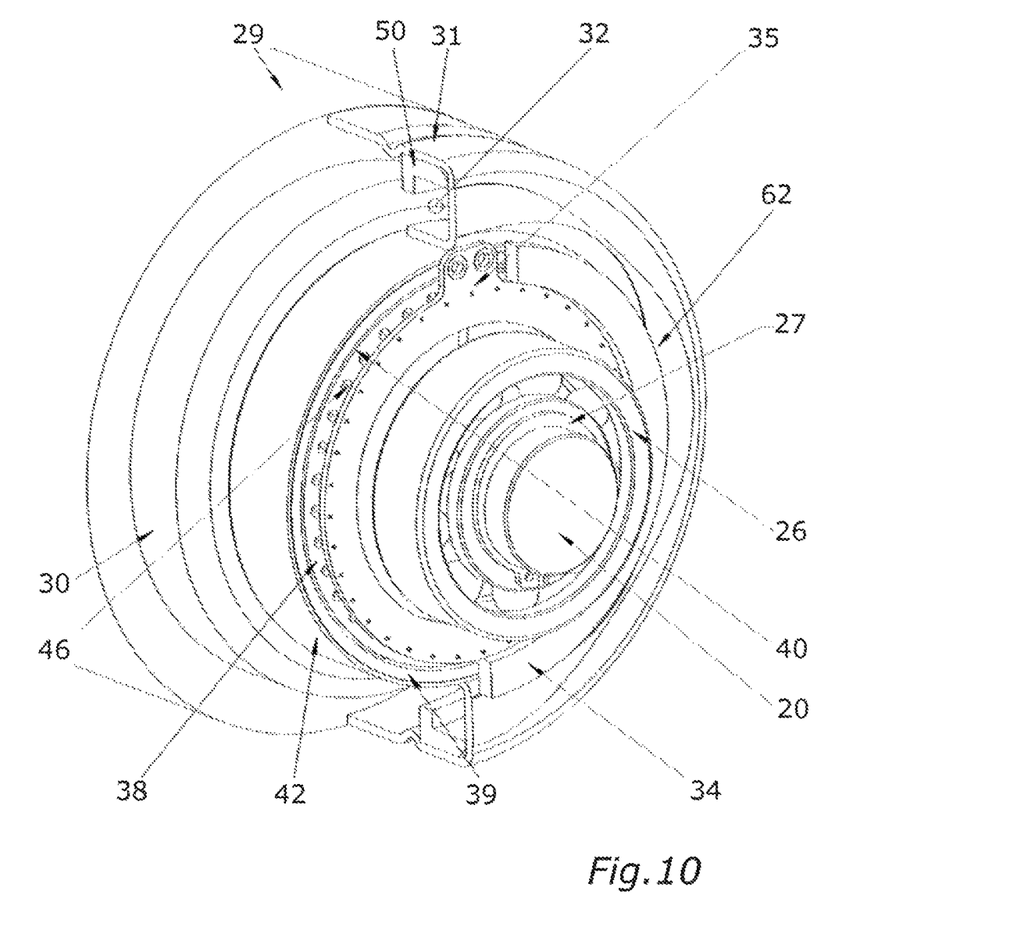
FIG. 10 a schematic representation of a perspective view of the rotor as a partial section.

As shown in FIGS. 3 to 5, the rotor 17 may be assembled with the secondary unit of the power transmission system in the following order and with the following manufacturing steps.

First, the laminated rotor core 29 is wound with the winding wire of the excitation winding 18. Since a DC current is fed into the rotor 17 of an externally excited synchronous machine during operation, the rotor 17 has two winding ends for contacting, i.e. two wires 33. State of the art is to wind an externally excited rotor with a round wire. Other types of winding may also be used.

The end winding cover 31 is joined to the laminated rotor core 29 along the axial direction 28 (fitting-on direction or sliding direction) (FIG. 3). After that or before that, the secondary unit SEC of the rotary transformer of the power transmission system 21 is inserted into the end winding cover 31. It is conceivable that the end winding cover 31 and the secondary unit SEC of the rotary transformer are joined to the laminated rotor core 29 at the same time, or first the secondary unit SEC of the rotary transformer and then the end winding cover 31. By inserting the secondary unit SEC into the end winding cover, the manufacturing method allows both an integrated solution and a stand-alone solution for the secondary unit SEC.

A defined distance 51 between the laminated rotor core 29, the end winding cover 31 and the secondary unit SEC of the rotary transformer allows the winding wire 33 to be placed onto the winding hooks 47 and a clearance for a welding electrode 52 during the welding process. In FIG. 3, the welding electrode 52 is inserted along a radial direction 54 (perpendicularly in FIG. 3). The welding electrode 52 represents a first fastening tool. A tubular electrode 55 is proposed as the counter electrode. The tubular electrode 55 represents a second fastening tool. The secondary unit SEC is designed and arranged in such a way that the tubular electrode 55 does not touch the rotor shaft 20 and the ferrite core 39 of the rotary transformer. The tubular electrode 55 also serves as support for the winding hook 47 during the placement of the winding wire 33 onto the hook 47 and during the welding process. The winding hook 47 is pressed together during the welding process by the radially acting electrode 52. When the current is applied and the hook is pressed together during welding, the insulation of the winding wire 33 is burned off. This creates a secure electrical connection.

During the winding process, the two ends of the winding wire 33 are placed onto the two winding hooks 47, which are connected directly to the rectifier board 43. The electrode 52, aligned vertically in FIG. 3, presses the winding hook 47 from above and current is applied between the vertical electrode 52 and the tubular electrode 55.

FIG. 4 shows how, after the welding process, the end winding cover 31 and the secondary unit SEC of the rotary transformer are brought into an end position by being pushed in the axial direction 28 toward the laminated core 29.

As an alternative to the welding described, other connecting techniques may be used for connecting the winding wire 33 and the winding hook 47: brazing, crimping or clamping.

In the case of this manufacturing method with an industrialization concept, the winding hooks 47 have three functions
they must be able to absorb and withstand the winding forces when the winding wire 33 is placed on them;
they must allow the welding process;
they must ensure a secure electrical connection to the rectifier board 43.

The winding hooks 47 are preferably connected directly to the rectifier board 43. A rectifier board 43 with an aluminum core is additionally proposed. As an alternative, a rectifier board 43 with a copper core may also be used, as a result of which the heat dissipation is improved.

When the laminated core 29 is wound, the two ends of the winding wire 33 are placed onto the two winding hooks 47, which are connected directly to the rectifier board 43. Placement generally involves a great force effect by the winding machine. For this reason, the aluminum or copper cores are not only used for cooling the electronic parts or components of the rectifier board 43, but also serve as a reinforcing layer of the circuit board of the rectifier board 43 when the winding wire 33 is placed and welded. The winding hooks 47 are preferably pushed through the rectifier board 43 and mechanically and electrically connected on the other side (connecting side with copper layer for conductor tracks) of the rectifier board 43. For example, the following connecting techniques may be used: screwing, soldering, clamping and welding. A reliable electrical contact with the copper tracks of the circuit board of the rectifier board 43 is realized both on the winding hook side and on the other side (connecting side). The winding hooks may also be electrically contacted on both sides of the rectifier board.

In order, due to high centrifugal forces, to be able to guarantee rotational speed stability (over 15 000 per minute) for traction drives, the externally excited rotor 17 may be potted with an epoxy resin or filled with a plastic using an injection-molding process.

If the secondary unit SEC of the rotary transformer is to be considered as a separate part (stand-alone solution), the parts of the secondary unit SEC are potted together or overmolded with a plastic independently of the rotor 17 (see FIG. 2). Thereafter, the potted or overmolded secondary part SEC is contacted with the two winding ends 33 of the rotor 17 and accommodated in the already potted laminated core 29 in the end winding cover 31. Such a stand-alone solution makes sense, for example, if a number of rotors have a different geometry or power and it makes no sense to use different geometries for the rotary transformer of the power transmission system 21.

In the following description, only the integrated solution for the rotary transformer is described as a more cost-effective solution on the basis of FIG. 5 (without considering a stand-alone solution).

When potting or filling the externally excited rotor 17, the rotor 17 must be sealed off with respect to the outside, in order that the potting or injection-molding compound does not escape from the outer geometry of the rotor 17.

In order that the rotor is potted together with the secondary unit SEC of the rotary transformer, the geometry and structure shown of the rotor with the rotary transformer are proposed. In the publications 20 2012 002 024 U1 and DE 20 2012 002 027 U1, it is proposed that the two end windings of the rotor 17 with the end winding covers (made of a special stainless steel, as described in the publications) are secured against centrifugal forces using a potting compound or using a plastic injection compound (general filling compound). The end winding covers are secured against axial slipping and radial forces with the aid of the undercuts of the balancing rings and the potting 32.

The geometry of the secondary unit SEC of the rotary transformer is designed in such a way that reliable sealing during the potting process and the axial and radial air gap 40, 40' are ensured.

Axial and radial air gaps 40, 40' between rotating and stationary parts of the contactless power transmission system 21 are the decisive factors of the contactless power transmission. The smaller the two air gaps 40, 40' are, the less losses occur during the power transmission.

At the same time, the mechanical tolerances of the individual parts and assemblies of the electric machine 12 (see FIG. 1) rather require an enlargement of the axial and radial air gap 40, 40', in order that the rotating and stationary parts (for example the rotor 17 and the stator 16 of the machine 12) do not touch during operation. The smaller the radial air gap 40 between the stator and the rotor of the electric machine (the rotary transformer itself is not meant here), the more expensive it is to manufacture the machine 12. The development of an economical manufacturing concept is faced with the challenge of finding a compromise between these two opposing demands.

The structure or the geometry of the power transmission system 21 allows a sealing concept of the rotor 17 during the potting with epoxy resin or injection molding with a plastic.

FIG. 4 shows in this respect how, after the welding, brazing, crimping or clamping of the winding wire 33 onto the winding hook 47, the cover 31 of the end winding (and the secondary unit SEC) is placed axially onto the laminated rotor core 29 as far as it will go. The interface or contact point between the laminated rotor core 29 and the cover 31 of the end winding must be sealed in the potting or plastic molding tool. For this purpose, a silicone ring or a silicone sleeve 56 is pulled onto the rotor 17, for example when potting, in the region of the interface with the end winding cover 31. After potting, the sleeve 56 is removed. Since the cured potting compound 32 does not stick to the silicone, the sleeve 56 may be used several times.

The silicone ring or the silicone sleeve 56 centers the end winding cover 31 radially during the potting process, and at the same time the secondary unit SEC of the rotary transformer integrated in the cover 31.

Axially, a silicone ring or silicone plug 57 (see FIG. 5) is proposed for sealing an annular gap 58 between the secondary unit SEC and the shaft 20, and ultimately the entire rotor 17.

The rotor 17 may now be potted or filled by injection molding. Such a rotor system is preferably potted upright (see FIG. 5) with epoxy resin under a vacuum. The rotor is thereby (preferably) placed on the other side of the rotor (upright) in the potting tool. The potting compound is preferably injected into the evacuated rotor from bottom to top under pressure along a potting direction 59. When potting or injection molding, the rotor must be vented, in order that the interior is completely filled without air pockets. For this purpose, venting openings 60 are provided, for example in the end winding cover 31. The air may escape along a venting direction 61.

In the case of injection molding with a plastic, the silicone ring (sleeve 56) shown in FIG. 5 is substituted by a sealing part in the injection-molding tool. Just like the sleeve 56 in the region of the interface, the silicone plug 57 is substituted by a sealing part in the injection-molding tool.

In general, the silicone sealing parts may be removed after potting and used again. When injection molding with a plastic, the (horizontal or vertical) position of the rotor 17 is irrelevant.

The axial sealing concept described above plays an important role for the radial and axial air gap 40, 40' between the two ferrite cores 38, 39 (see FIG. 1). If for example when the rotor 17 is potted, the potting compound escapes in the region of the silicone plug 57, the radial air gap 40 between the two ferrite cores 38, 39 becomes smaller. The narrowed air gap may lead to the rotary transformer being damaged.

FIG. 6, FIG. 7, FIG. 8, FIG. 9 and FIG. 10 show the completely assembled rotor 17. Generally, in the case of externally excited synchronous machines, a rotor requires a rotor position encoder. The accommodation of a sensor track 62 and the balancing ring 50 has already been described in the publications DE 20 2012 002 024 U1 and DE 20 2012 002 027 U1. However, the sensor track is just an example. A special material composition for the end winding cover 31 of the end winding 30, the rolled-in balancing ring 50 and (optionally) a sensor track 62, which are applied to the end winding cover 31 by the cold-gas spraying process, are preferably also used in the case of the manufacturing method presented here. The cited documents are therefore to be regarded as part of the present description.

Overall, the example shows how a manufacturing method for a traction drive with an externally excited synchronous machine and with contactless excitation current transmission and high temperature resistance and speed stability may be provided by the invention.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS

10 Motor vehicle
11 Electric traction drive
12 Electric machine
13 Inverter
14 Traction battery
15 Stator winding
16 Stator
17 Rotor
17' End face
18 Excitation winding
19 Axis of rotation
20 Shaft
21 Power transmission system
22 Primary winding
23 Secondary winding
24 Motor housing
25 Spring element
26 Bearing
27 Rings
28 Axial direction
29 Laminated rotor core
30 End windings (of the excitation winding 18)
31 Cover
32 Potting compound
32' Injection-molded filling
33 Wires
34 Heat sink
35 Connection board
36 Metal pin
37 Winding board
38 Ferrite core
39 Ferrite core
40 Radial air gap
40' Axial air gap
41 Winding board
42 Heat sink
43 Rectifier board
44 Capacitors
45 Diodes
46 Metal pins
47 Hooks
48 Metal screw
49 Conductor tracks
50 Balancing ring
51 Distance
52 Welding electrode
54 Radial direction
55 Tubular electrode
56 Sleeve
57 Silicone plug
58 Annular gap
59 Potting direction
60 Venting opening
61 Venting direction
62 Sensor track
PRIM Primary unit
SEC Secondary unit

What is claimed is:

1. A method for manufacturing a rotor for an electric machine with a contactless power transmission system, comprising steps of
providing an end winding cover;
providing a rotor;
providing a laminated core, the laminated core being part of the rotor;
providing a secondary unit (SEC), the secondary unit (SEC) being part of the power transmission system;
providing a cavity delimited by the laminated core; and
providing a filling compound;
arranging the end winding cover on an end face of the laminated core of the rotor;
integrating the secondary unit (SEC) of the power transmission system in the end winding cover such that after the end winding cover has been arranged on the end face of the laminated core of the rotor, the secondary unit (SEC) is held on the rotor indirectly via the end winding cover;
filling the laminated core and the cavity delimited by the laminated core and the end winding cover with the filling compound such that the end winding cover is held on the laminated core by curing the filling compound.

2. The method of claim 1, further comprising the steps of:
providing a through-opening which is part of the end winding cover; and
providing the secondary unit (SEC) to be a ring;
inserting the ring into the through-opening.

3. The method of claim 1, further comprising the steps of:
providing a sleeve;
using the sleeve to hold the end winding cover on the laminated core as the wound laminated core and the cavity delimited by the laminated core and the end winding cover are filled with the compound.

4. The method of claim 1, further comprising the steps of:
providing a shaft of the rotor;
providing an annular gap between the secondary unit (SEC) and the shaft of the rotor; and
providing an annular plug;
closing the annular gap with the annular plug to fill the rotor.

5. The method of claim 1, further comprising the steps of providing the filling compound to further comprise a potting compound.

6. The method of claim 1, further comprising the steps of:
providing the filling compound to further comprise an injection-molding compound;
filling the wound laminated core and the cavity delimited by the laminated core and the end winding cover with the injection-molding compound using an injection-molding process.

7. The method of claim 1, further comprising the steps of:
providing a first fastening tool;
providing a second fastening tool;
providing at least one electrical connection contact of an excitation winding of the rotor; and
providing a respective contact element of a rectifier of the secondary unit (SEC);
arranging the end winding cover with the secondary unit (SEC) arranged therein;
holding the end winding cover a distance from the end face of the rotor;
moving the first fastening tool along a radial direction between the end face and the end winding cover;
moving the second fastening tool along an axial direction between the end winding cover and a shaft surface of the rotor;
using the fastening tools to connect the at least one electrical connection contact of the excitation winding of the rotor to the respective contact element of the rectifier of the secondary unit (SEC).

8. The method of claim 7, further comprising the steps of using the fastening tools to fasten the at least one connection contact to the respective contact element by at least one of soldering or welding or crimping or clamping.

9. The method of claim 7, further comprising the steps of:
providing the second fastening tool to be a tube;
slipping the tube over a shaft end of the rotor.

10. The method of claim 7 further comprising the steps of:
providing a winding hook to be the respective contact element; and
providing a rectifier board;
inserting the winding hook into the rectifier board of the rectifier.

11. The method of claim 10, further comprising the steps of providing a metal core in the rectifier board.

* * * * *